US00RE41213E

(19) United States
(12) Reissued Patent
Fujii

(10) Patent Number: US RE41,213 E
(45) Date of Reissued Patent: *Apr. 13, 2010

(54) DYNAMIC AMOUNT SENSOR AND PROCESS FOR THE PRODUCTION THEREOF

(75) Inventor: Tetsuo Fujii, Toyohashi (JP)

(73) Assignee: Denso Corporation, Kariya (JP)

( * ) Notice: This patent is subject to a terminal disclaimer.

(21) Appl. No.: 10/315,859

(22) Filed: Dec. 10, 2002

Related U.S. Patent Documents

Reissue of:
(64) Patent No.: 6,227,049
Issued: May 8, 2001
Appl. No.: 08/566,600
Filed: Dec. 4, 1995

U.S. Applications:
(62) Division of application No. 10/123,220, filed on Apr. 17, 2002, which is a continuation of application No. 08/167,976, filed on May 11, 1994, now abandoned.

(30) Foreign Application Priority Data

Apr. 27, 1992 (JP) ..... 4-108020
Apr. 23, 1993 (WO) ..... PCT/JP93/00535

(51) Int. Cl.
*G01P 15/125* (2006.01)

(52) U.S. Cl. ..... 73/514.18; 73/73; 73/514.32; 73/514.36

(58) Field of Classification Search ..... 73/514.18, 73/514.32, 514.36, 514.16, 514.29, 514.17
See application file for complete search history.

(56) References Cited

U.S. PATENT DOCUMENTS 4,483,194 A 11/1984 Rudolf
4,507,705 A 3/1985 Hoshino et al.
4,574,327 A 3/1986 Wilner
4,598,585 A 7/1986 Boxenhorn (Continued)

FOREIGN PATENT DOCUMENTS

GB 2 240 178 7/1991
GB 2 246 635 2/1992

(Continued)

OTHER PUBLICATIONS

Office Action issued by Japanese Patent Office Action on Oct. 23, 2001 in connection with Priority Application No. JP 4–108020 and citing various ones of above references.
Payne et al., "Surface Micromachined Acceleromweter: A Technology Update," SAE Technical Paper Series, Feb. 25, 1991, pp. 127–135.

*Primary Examiner*—Helen C. Kwok
(74) *Attorney, Agent, or Firm*—Harness, Dickey & Pierce, PLC

(57) ABSTRACT

A single crystal silicon substrate (1) is bonded through an $SiO_2$ film (9) to a single crystal silicon substrate (8), and the single crystal silicon substrate (1) is made into a thin film. A cantilever (13) is formed on the single crystal silicon substrate (1), and the thickness of the cantilever (13) in a direction parallel to the surface of the single crystal silicon substrate (1) is made smaller than the thickness of the cantilever in the direction of the depth of the single crystal silicon substrate (1), and movable in a direction parallel to the substrate surface. In addition, the surface of the cantilever (13) and the part of the single crystal silicon substrate (1), opposing the cantilever (13), are, respectively, coated with an $SiO_2$ film (5), so that an electrode short circuit is prevented in a capacity-type sensor. In addition, a signal-processing circuit (10) is formed on the single crystal silicon substrate (1), so that signal processing is performed as the cantilever (13) moves.

23 Claims, 15 Drawing Sheets

U.S. PATENT DOCUMENTS

| | | | | | |
|---|---|---|---|---|---|
| 4,653,326 | A | | 3/1987 | Danel et al. | |
| 4,679,434 | A | | 7/1987 | Stewart | |
| 4,711,128 | A | | 12/1987 | Boura | |
| 4,783,237 | A | | 11/1988 | Aine et al. | |
| 4,891,984 | A | | 1/1990 | Fujii et al. | |
| 4,896,268 | A | | 1/1990 | MacGugan | |
| 4,951,510 | A | | 8/1990 | Holm-Kennedy et al. | |
| 5,006,487 | A | | 4/1991 | Stokes | |
| 5,008,774 | A | | 4/1991 | Bullis et al. | |
| 5,095,349 | A | | 3/1992 | Fujii et al. | |
| 5,095,401 | A | * | 3/1992 | Zavracky et al. | 361/283.4 |
| 5,115,291 | A | | 5/1992 | Stokes | |
| 5,151,763 | A | | 9/1992 | Marek et al. | |
| 5,205,171 | A | * | 4/1993 | O'Brien et al. | 73/514.18 |
| 5,233,213 | A | | 8/1993 | Marek | |
| 5,243,861 | A | * | 9/1993 | Kloeck et al. | 73/514.32 |
| 5,284,057 | A | | 2/1994 | Staller et al. | |
| 5,296,730 | A | | 3/1994 | Takano et al. | |
| 5,313,836 | A | | 5/1994 | Fujii et al. | |
| 5,314,572 | A | | 5/1994 | Core et al. | |
| 5,331,853 | A | | 7/1994 | Hulsing, II | |
| 5,337,606 | A | | 8/1994 | Bennett et al. | |
| 5,345,824 | A | | 9/1994 | Sherman et al. | |
| 5,359,893 | A | | 11/1994 | Dunn | |
| 5,367,429 | A | * | 11/1994 | Tsuchitani et al. | 361/280 |
| 5,417,111 | A | | 5/1995 | Sherman et al. | |
| 5,417,312 | A | * | 5/1995 | Tsuchitani et al. | 188/181 A |
| 5,495,761 | A | | 3/1996 | Diem et al. | |
| 5,511,420 | A | | 4/1996 | Zhao et al. | |
| 5,542,295 | A | | 8/1996 | Howe et al. | |
| 5,561,248 | A | | 10/1996 | Negoro | |
| 5,563,343 | A | | 10/1996 | Shaw et al. | |
| 5,610,335 | A | | 3/1997 | Shaw et al. | |

FOREIGN PATENT DOCUMENTS

| | | | |
|---|---|---|---|
| JP | 59-44875 | | 3/1984 |
| JP | 60-29629 | | 2/1985 |
| JP | 60-244864 | | 12/1985 |
| JP | 61-73071 | * | 4/1986 |
| JP | 62-27666 | * | 2/1987 |
| JP | 62-93668 | | 4/1987 |
| JP | 62-174978 | | 7/1987 |
| JP | 62-207917 | | 9/1987 |
| JP | 62-232171 | | 10/1987 |
| JP | 63-25982 | | 2/1988 |
| JP | 63-250865 | | 10/1988 |
| JP | 2-237 166 | | 9/1990 |
| JP | 2-309259 | | 12/1990 |
| JP | 3-94168 | | 4/1991 |
| JP | 3-205565 | | 9/1991 |
| JP | 4-76956 | | 3/1992 |
| JP | 404076956 A | * | 3/1992 |
| JP | 6-88837 | | 3/1994 |
| JP | 6-173071 | | 6/1994 |
| JP | 6-227666 | | 8/1994 |
| JP | 8-510837 | | 11/1996 |
| WO | 91/12497 | | 8/1991 |

* cited by examiner

DYNAMIC AMOUNT SENSOR AND PROCESS FOR THE PRODUCTION THEREOF

Matter enclosed in heavy brackets [ ] appears in the original patent but forms no part of this reissue specification; matter printed in italics indicates the additions made by reissue.

*This application is a Divisional Application of Ser. No. 10/123,220, filed Apr. 17, 2002 which is a Re-Issue Application of U.S. Pat. No. 6,227,049.*

*Notice: More than one reissue application has been filed for reissue of Pat. No. 6,227,049. The reissue applications are application Nos. 10/123,220, 10/315,566, 10/315,859 (the present application), 10/315,827, 10/315,861, all of which are Divisional reissues of Pat. No. 6,227,049.*

This is a continuation of application Ser. No. 08/167,976, filed on May 11, 1994, now abandoned.

BACKGROUND OF THE INVENTION

1. Field of the Invention

The present invention relates to an acceleration sensor, and more specifically, a semiconductor type acceleration sensor suitable for a air-bag system, a suspension control system, or the like, for automobiles.

2. Description of the Related Art

In producing a semiconductor type acceleration sensor, the movable part thereof has hitherto been prepared in such a way that it penetrates a single crystal silicon wafer. Accordingly, the movable part must be sized so as to penetrate through the thickness of a wafer, and therefore, it has been difficult to miniaturize the acceleration sensor. In addition, in order to incorporate this sensor into a package, a relaxation part, have been required such as a pedestal, in order to release the stress caused by the difference in coefficients of thermal expansion or the like.

However, in Nikkei Electronics, Nov. 11, 1991 (No. 540), pp 223 to 231, there is illustrated an acceleration sensor produced by use of a surface micro-machining technique. According to this technique, a thin polysilicon film is laminated on a silicon substrate, and this polysilicon film is etched, whereby a beam movable parallel to the surface of the substrate is formed, so as to form a differential capacity type acceleration sensor. However, when a beam structure is formed by use of polysilicon, if a signal processing circuit is formed around the formed beam structure, the sensor characteristics become unstable. This is because the beam structure is formed of a polycrystalline and amorphous material, resulting in noticeable variation for every production lot. Accordingly, it is still desirable to form an acceleration sensor by surface micro-machining single crystal silicon.

Under such circumstances, the purpose of the present invention is to provide an acceleration sensor having a novel structure, by which high precision and high reliability can be realized.

In addition, another purpose of the present invention is to produce this acceleration sensor with a good yield rate during the production process thereof.

SUMMARY OF THE INVENTION

The gist of a first embodiment of the present invention resides in an acceleration sensor, comprising a second single crystal silicon substrate bonded onto a first single crystal silicon substrate with an insulating film interposed therebetween, the second single crystal silicon substrate being made of a thin film, a beam formed on at least either of said first and second single crystal silicon substrates and movable in a direction parallel to the surface thereof, and a signal-processing circuit formed on at least one of said first and second single crystal silicon substrates for performing processing of signals produced by a movement of beam, caused by an acceleration.

In addition, the gist of a second embodiment of the present invention resides in a process for producing an acceleration sensor, comprising: a first step of forming, on a main surface of a first single crystal silicon substrate, a groove with a predetermined depth for formation of a beam; a second step of forming, on the main surface of said first single crystal silicon substrate, a film of a polycrystaline silicon, and amorphous silicon or a mixture thereof so as to fill said groove with said silicon film, and smoothing (flattening) the surface of said silicon film; a third step of bonding the main surface of said first single crystal silicon substrate to a second single crystal silicon substrate with an insulating film formed thereon, said insulating film being interposed between said first and second single crystal silicon substrates; a fourth step of polishing the reverse side of said first single crystal silicon substrate to a predetermined degree, so as to make said first single crystal silicon substrate a thin film; and a fifth step of forming a signal-processing circuit on at least either of said first and second single crystal silicon substrates, and thereafter, removing by etching said silicon film of a polycrystal silicon, an amorphous silicon or a mixture thereof from said reverse side of said first single crystal silicon substrates, to form a beam.

In addition, the gist of a third embodiment of the present invention resides in a process for producing an acceleration sensor, comprising; a first step of bonding a main surface of a first single crystal silicon substrate to a second single crystal silicon substrate with an insulating film formed thereon, said insulating film being interposed therebetween; a second step of polishing the reverse side of said first single crystal silicon substrate to a predetermined degree, so as to make the first single crystal silicon substrate a thin film; a third step of forming a groove with a predetermined depth for formation of a beam; a fourth step of forming, on the reverse side of said first single crystal silicon substrate, a film of a polycrystal silicon, an amorphous silicon or a mixture thereof, so as to fill said groove with said silicon film, and smoothing the surface of said silicon film; and a fifth step of forming a signal-processing circuit on at least one of said first and second single crystal silicon substrates, and thereafter, removing by etching said film of polycrystal silicon, amorphous silicon or a mixture thereof from the reverse side of the first single crystal silicon substrate, to form a beam.

In the first embodiment, when an acceleration is applied in a direction parallel to the surface of the bonded single crystal silicon substrates, the beam formed on the first or second single crystal silicon substrate moves. As this beam moves, signal processing is performed in the signal-processing circuit formed on the first or second single crystal silicon substrate.

In the second embodiment, as a first step, a groove of a predetermined depth for formation of a beam is formed on the main surface of the first single crystal silicon substrate, and as a second step, a film of a polycrystalline silicon, an amorphous silicon or a mixture thereof is formed on the main surface of the first single crystal silicon substrate, whereby the groove is filled with the silicon film, and the surface of this silicon film is flattened. Subsequently, as a third step, the main surface of the first single crystal silicon substrate is bonded to a second single crystal silicon substrate having an insulating film formed thereon, said insulating film being interposed between the first and second single crystal substrates, and, as a fourth step, the reverse side of the first single crystal silicon substrate is polished to a predetermined degree, whereby the first single crystal silicon substrate is made into a thin film. Subsequently, as a fifth step, a signal-processing circuit is formed on the first or second single crystal silicon substrate, thereafter the polycrystalline, amorphous or mixed silicon film is removed by etching from the reverse side of the first single crystal silicon substrate, and a beam is formed. As a result, an acceleration sensor according to the first invention is produced.

In the third embodiment, as a first step, the main surface of a first single crystal silicon substrate is bonded to a second single crystal silicon substrate with an insulating film formed thereon, said insulating film being interposed between the first and second substrates, and as a second step, the reverse side of the first single crystal silicon substrate is polished to a predetermined degree, so that the first single crystal silicon substrate is made into a thin film. Subsequently, as a third step, a groove of a predetermined depth for formation of a beam is formed on the reverse side of the first single crystal silicon substrate, and as a fourth step, a film of polycrystalline silicon, an amorphous silicon or a mixture thereof is formed on the reverse side of the first single crystal silicon substrate, whereupon the groove is filled with the silicon film, and the surface of the silicon film is flattened. Subsequently, as a fifth step, a signal-processing circuit is formed on the first or second single crystal silicon substrate, whereafter the polycrystalline, amorphous or mixed silicon film is removed by etching from the reverse side of the first single crystal silicon substrate, and a beam is formed. As a result, an acceleration sensor according to the first embodiment is produced.

DETAILED DESCRIPTION OF THE PREFERRED EMBODIMENTS OF THE INVENTION

In the following, the embodiments and realizations of the present invention, will be explained with reference to the attached drawings.

First Embodiment

Figure 1:
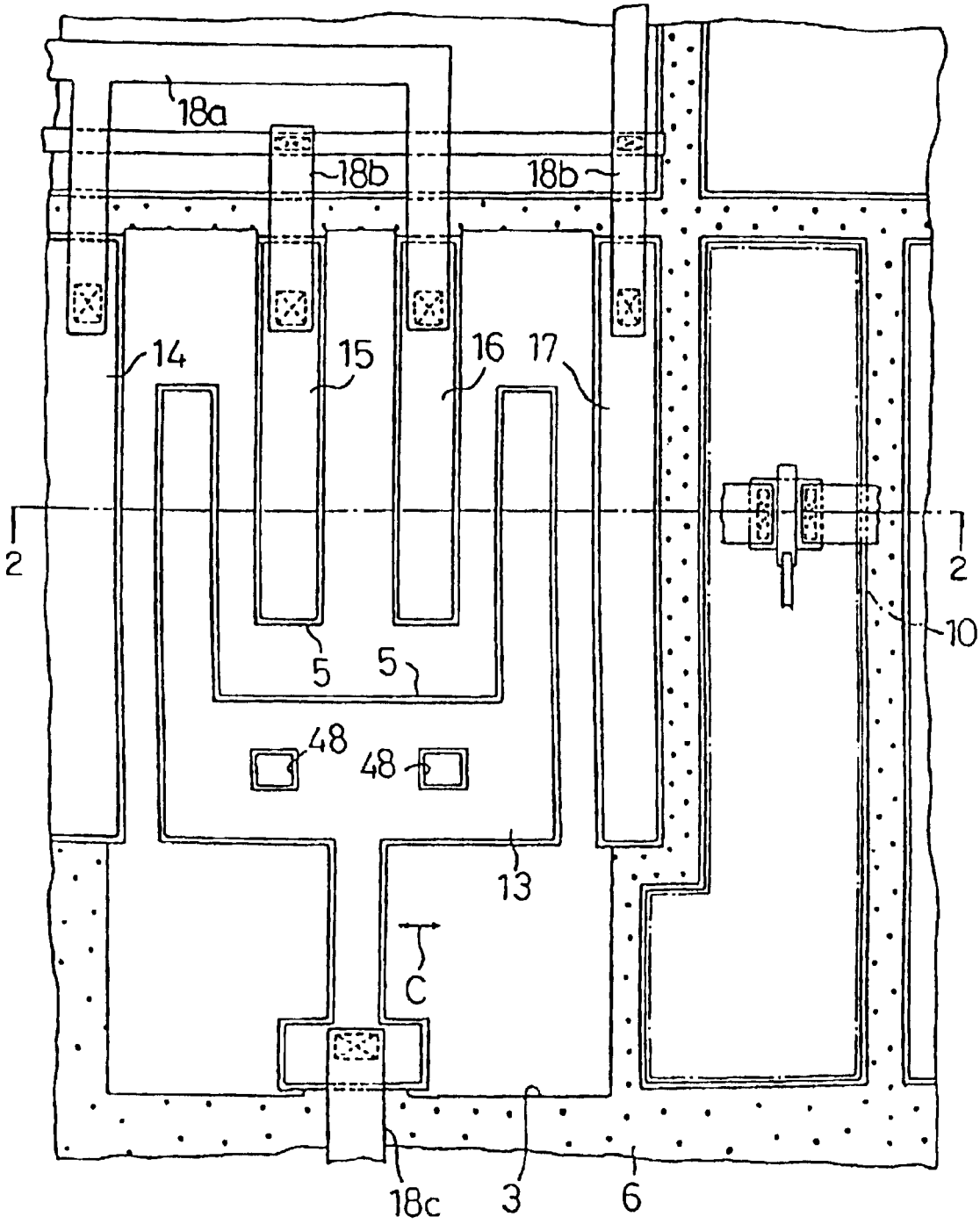
FIG. 1 is a plan of an acceleration sensor according to the first embodiment of the present invention.
Figure 2:
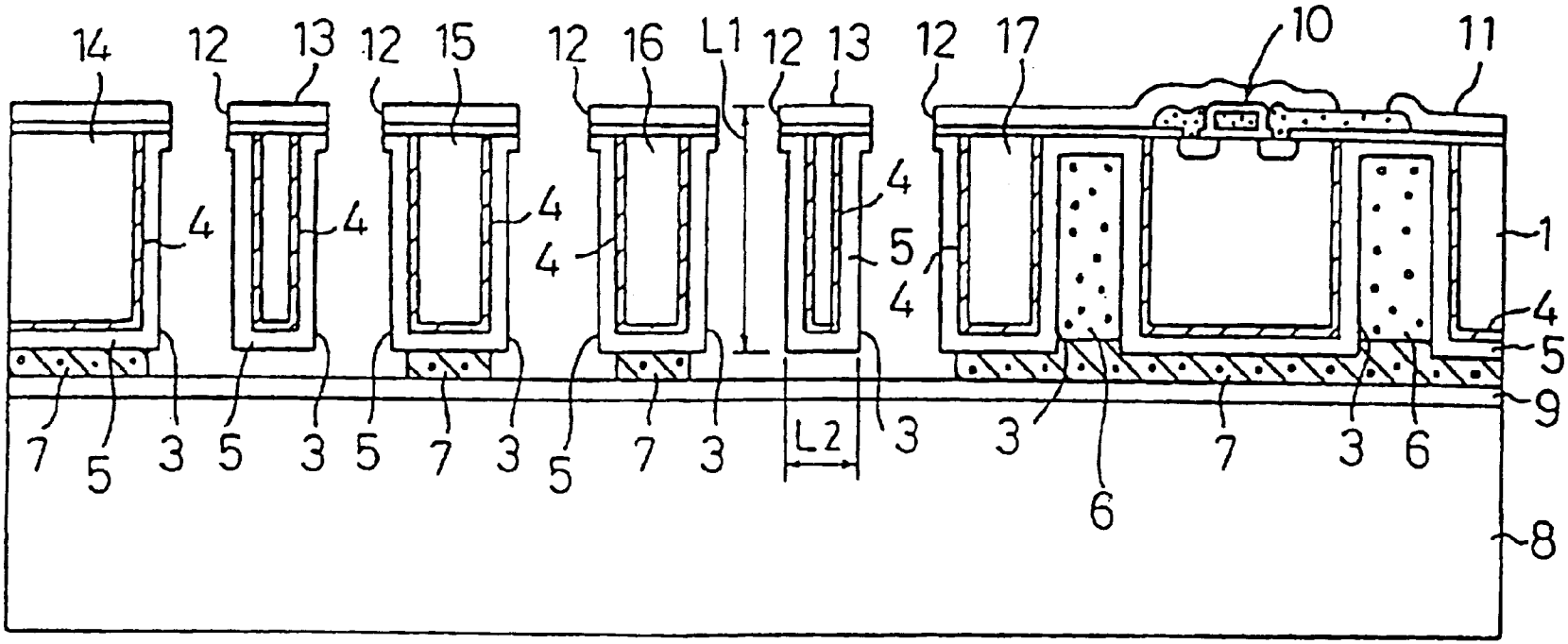
FIG. 2 is a cross-section taken along line 2—2 in FIG. 1.

FIG. 1 is a plain view plan of an acceleration sensor produced by the first embodiment of the present invention, and FIG. 2 is a sectional view taken along the line 2—2 in FIG. 1. In addition, in the present embodiment, the sensor part and the signal-processing circuit are formed of the same single crystal silicon substrate.

The present acceleration sensor is a capacity type acceleration sensor. As illustrated in FIG. 2, there is bonded onto a single crystal silicon substrate 8 a single crystal silicon substrate 1 through an $SiO_2$ film 9, and in the single crystal silicon substrate 1, there is formed a cantilever 13 by a trench 3 penetrating said substrate 1. As illustrated in FIG. 1, this cantilever 13 has a structure such that an end side thereof is branched into two parts. The cantilever 13 can be moved in a direction parallel to the surface of the single crystal silicon substrate 1 (the arrow direction C in FIG. 1). In addition, in the single crystal silicon substrate 1, a signal-processing circuit 10 is formed and is electrically insulated from the cantilever 13 by a polysilicon film 6 and an $SiO_2$ film 5.

In the following, the production process of the first embodiment of the present invention, which is suitable for the production of the aforesaid structure, will be explained with reference to FIGS. 3 to 10.

Figure 3:
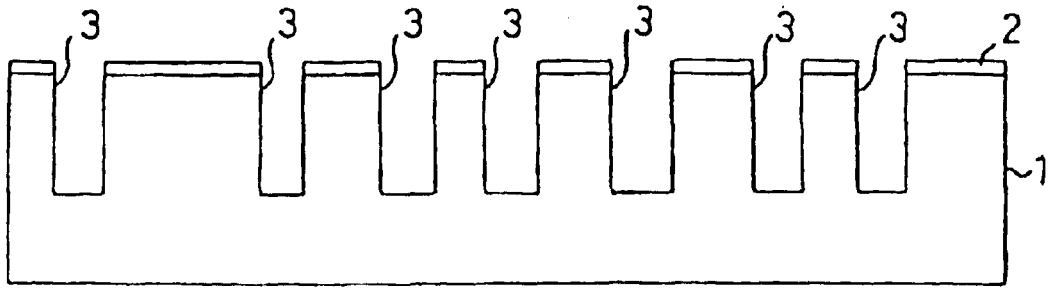
FIGS. 3 to 10 are illustrations for explanation of the manufacturing process of the first embodiment, and, respectively, a sectional view for each production stage.

First, as illustrated in FIG. 3, an n-type (100) single crystal silicon substrate 1 with a resistance of 1 to 20Ω·cm is provided, and on the main surface thereof, there is formed an $SiO_2$ film 2 with a thickness of about 1 μm by thermal oxidation, and the $SiO_2$ film 2 is formed into a predetermined pattern by a photolithographic method. This pattern is a pattern exposing, on the main surface of the silicon substrate, an area to be formed as a groove separating at least an area to be formed as a movable electrode (cantilever) from the substrate, and in the present embodiment, this pattern is formed as a pattern exposing also the main surface of the silicon substrate in an area for transversely insulating and separating the signal-processing circuit. Subsequently, on the main surface side of the single crystal silicon substrate 1, there is formed a trench 3 having a perpendicular wall with a predetermined depth, e.g. ranging from about 0.2 to about 30 μm. In the present embodiment, explanation will be made with respect to the case where the wall thickness is about 3 μm.

Figure 4:
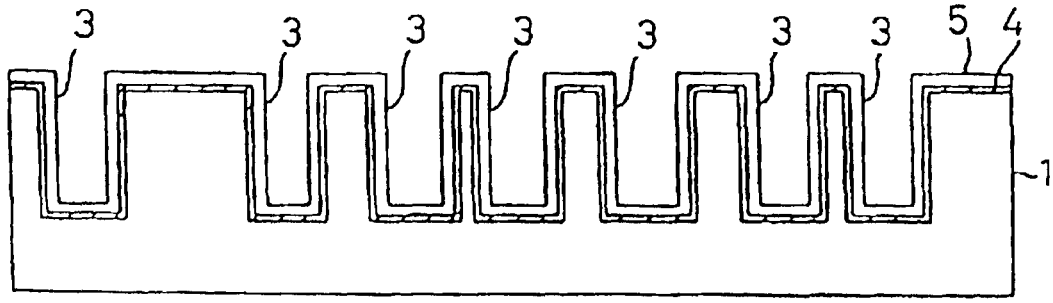

Subsequently, after the $SiO_2$ film 2 has been removed, as illustrated in FIG. 4, an $n^+$ diffused layer 4 formed using phosphorus, arsenic or the like is formed on the main surface of the single crystal silicon substrate 1, including the internal wall of the trench 3, and further, an $SiO_2$ film 5 with a thickness ranging from 0.1 to 1 μm is formed by thermal oxidation or the like. In this case, in order to prevent damage by etching, there may be conducted the so-called "sacrifice oxidation" in which $SiO_2$ is formed by thermal oxidation and removed before formation of the $n^+$ diffused layer 4.

Figure 5:
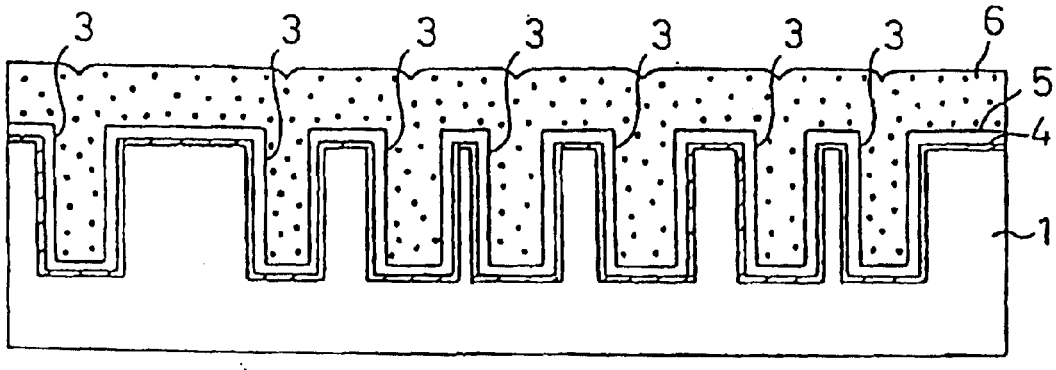

Subsequently, as illustrated in FIG. 5, a polysilicon film 6 is formed on the main surface of the single crystal silicon substrate 1, and the trench 3 is filled with the polysilicon film 6. In addition, in the case where an impurity is introduced into the polysilicon film 6 in order to use the polysilicon film 6 as a conductive path, forming a thin polysilicon layer and diffusing phosphorus or the like in a high concentration before formation of the polysilicon film 6, allows the impurity to be introduced into the polysilicon film 6.

Figure 6:
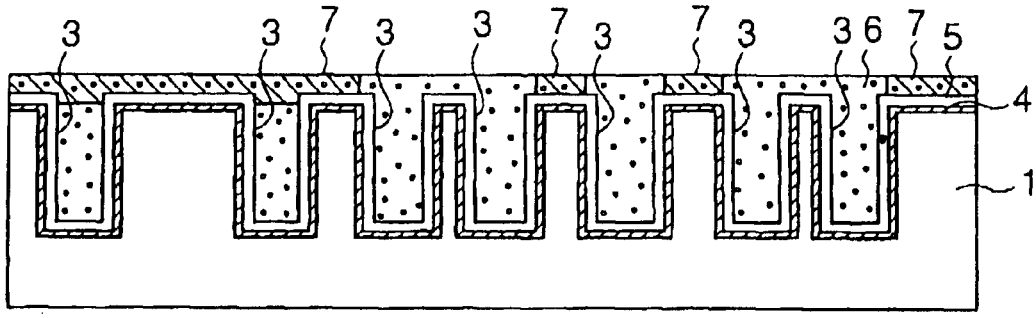

Next, as illustrated in FIG. 6, the surface of the polysilicon film 6 is mirror finished, so as to make the thickness of the polysilicon film 6 a predetermined value. Subsequently, boron ions or other impurity are implanted into the polysilicon film 6 to form $p^+$ diffused layers 7 in predetermined areas.

Figure 7:
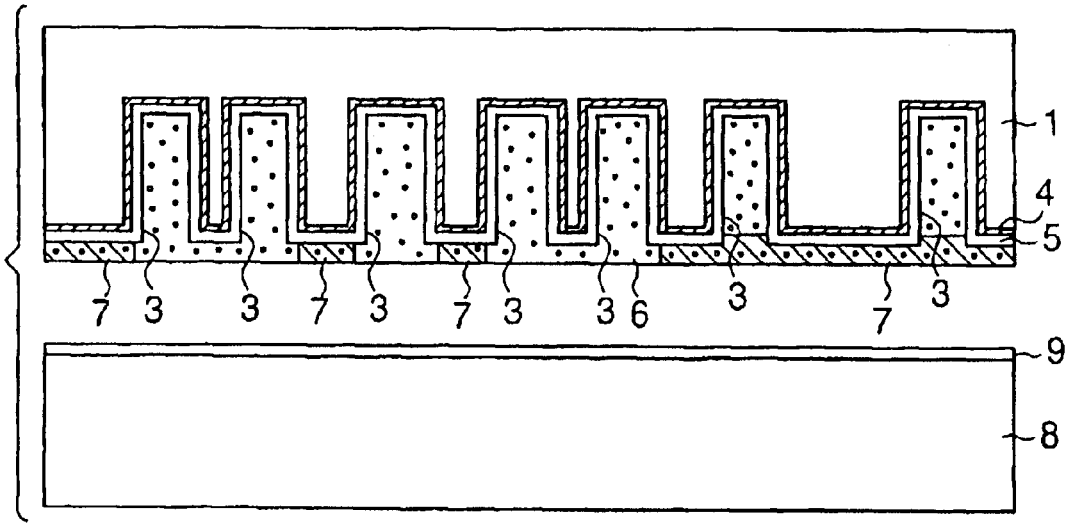

On the other hand, as illustrated in FIG. 7, another (100) single crystal silicon substrate 8 is provided, and an $SiO_2$ film 9 with a thickness ranging from 0.1 to 1.0 μm is formed on the main surface of the silicon substrate 8.

Figure 8:
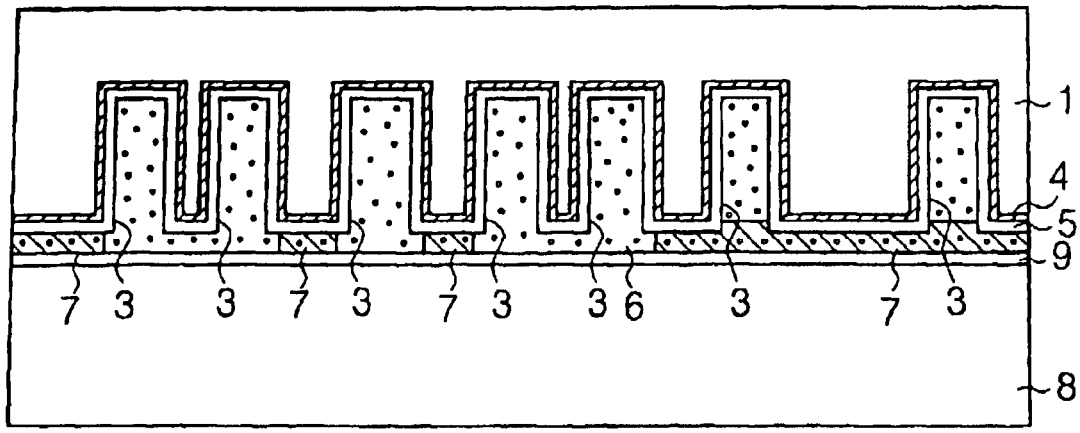

Subsequently, the single crystal silicon substrate 1 and the single crystal silicon substrate 8 are dipped into e.g. an aqueous mixed solution of aqueous hydrogen peroxide and sulfuric acid, so as to subject these substrates to a hydrophilicity-imparting treatment. Thereafter, these substrates are dried, and as illustrated in FIG. 8, the main surface of the single crystal silicon substrate 1 and that of the single crystal silicon substrate 8 are put together at room temperature, and these substrates are introduced into a furnace at 400 to 1100° C. for a period of time ranging from 0.5 to 2 hours, so as to strongly bond them.

Figure 9:
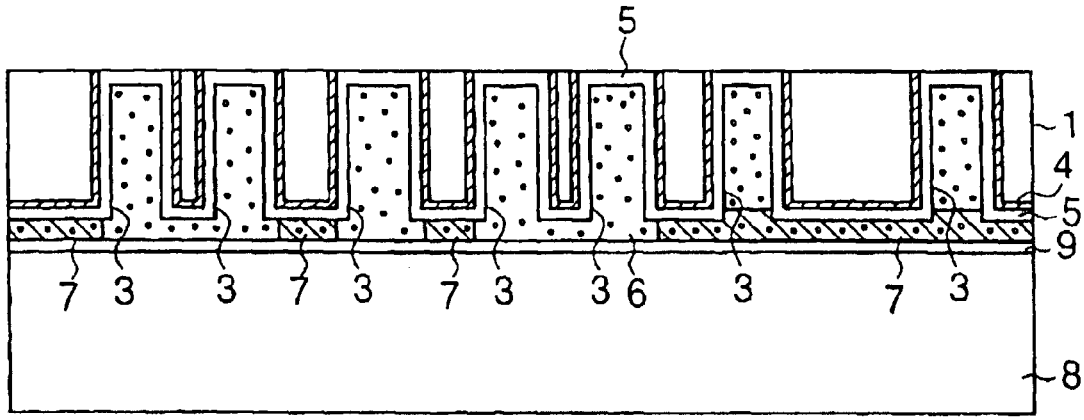

Subsequently, as illustrated in FIG. 9, by use of an aqueous solution of an alkali type, e.g. an aqueous KOH solution or the like, the reverse side of the single crystal silicon substrate 1 is subjected to selective polishing. The polishing is continued until the $SiO_2$ film 5 is exposed. As a result, the thickness of the single crystal silicon substrate 1 reaches a value which is approximately determined by the depth of the trench, e.g. about 3 μm, so that the substrate 1 is made thin.

Figure 10:
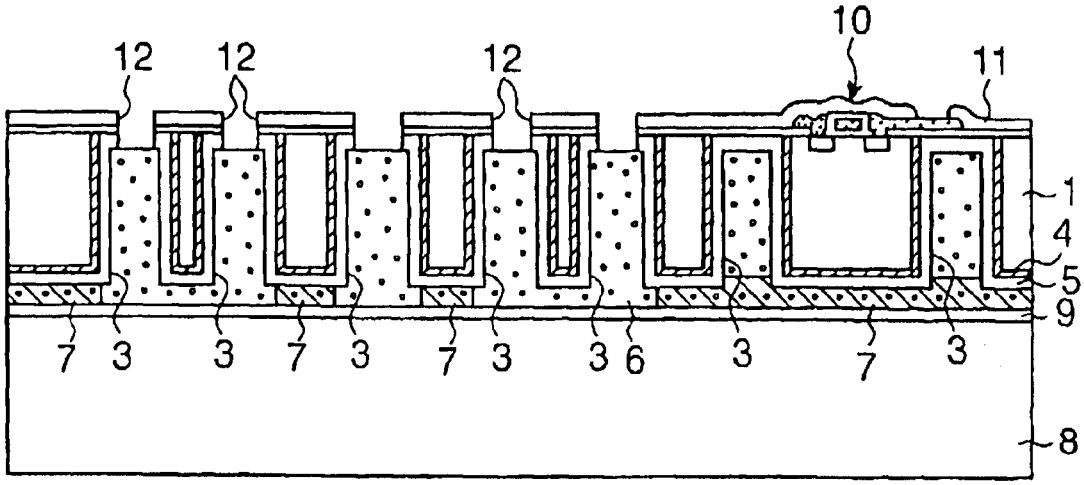

Subsequently, as illustrated in FIG. 10, in a predetermined area of the single crystal silicon substrate 1, there is formed a single-processing circuit 10 (IC circuit portion) by use of an ordinary CMOS process, bipolar process or the like. In addition, a diffused layer for connecting to wiring and a metallic electrode film composed of an aluminum film or the like are formed, and wiring at the sensor part, wiring at the circuit part, and connection of the sensor part to the circuit part are performed. In FIG. 1 and FIG. 10, a MOS transistor alone is illustrated as a part of the signal-processing circuit 10.

Further, on the upper surface of the signal-processing circuit 10, there is formed, as a passivation film 11, a plasma SiN film (P-SiN) e.g. by a plasma CD method. Subsequently, at the sensor part side, windows 12 are opened at predetermined areas of the passivation film 11, and the polysilicon film 6 filled in the trench 3 is exposed from the surface. By this window opening procedure, the single crystal portions where a cantilever or fixed electrodes are to be formed are demarcated from the polycrystal portions embedded in the trench, on the surface of the substrate.

Subsequently, as illustrated in FIG. 2, by use of a 20% solution of TMAH (tetramethylammonium hydroxide) $(CH_3)_4NOH$, the polysilicon film 6 is removed by etching through the windows 12 of the passivation film 11, from the reverse side (the upper side in FIG. 2) of the single crystalline silicon substrate 1. In this case, the passivation film 11 (P-SiN), $SiO_2$ film 5, aluminum wiring layer and $p^+$ diffused layer ($p^+$ polysilicon film) 7 are hardly etched by the selective etching. Accordingly, the bonding of the single crystal silicon substrate to the lower single crystal silicon substrate 8 is secured through the $p^+$ diffused layer ($p^+$ polysilicon film) 7.

In addition, if trenches 3 are preliminarily formed also in the wide area of the cantilever 13 in FIG. 1, and etching windows 48 are provided simultaneously with the formation of the windows 12, in such a way that the etching windows 48 communicate with said trenches 3, the polysilicon film 6 below the movable part (cantilever 13) of the sensor can be more securely removed by etching through this etching window 48 when the polysilicon film 6 is removed by etching.

By the aforesaid procedures, the cantilever 13 is formed. In this case, the cantilever 13 becomes, as illustrated in FIG. 2, smaller in the thickness L2 in a direction parallel to the surface of the single crystal silicon substrate 1 than in the thickness L1 in a direction along the depth of the single crystal silicon substrate 1.

In a capacity type acceleration sensor, the end portions (bifurcated portions) of the cantilever 13 are formed as movable electrodes, and as illustrated in FIG. 1, the parts of the single crystal silicon substrate 1, opposing the end portions of the cantilever 13, are formed as fixed electrodes 14, 15, 16, and 17, respectively. In addition, as illustrated in FIG. 1, fixed electrode 14 and fixed electrode 16 are derived through an aluminium wiring layer 18a, fixed electrode 15 and fixed electrode 17 are derived through an aluminium wiring layer 18b, and the cantilever 13 (movable electrode) is derived through an aluminium wiring layer 18c. These aluminium wiring layers 18a, 18b, and 18c are connected to the signal-processing circuit 10, and by this signal-processing circuit 10, signal processing is conducted as the cantilever (movable electrode) 13 is displaced owing to an acceleration. In addition, by the $n^+$ diffused layers 4 (see FIG. 2) disposed on the cantilevers 13 (movable electrodes) and fixed electrodes 14, 15, 16, and 17, the electric potential is maintained at a constant value.

Although a capacity type acceleration sensor is made in the present embodiment, if a piezo resistance layer is formed at the surface of the root portion of the cantilever 13, a piezo resistance type acceleration sensor can be formed. As a matter of course, if these two types of sensors are formed in a one and same substrate, the precision and reliability of the acceleration sensor can further be improved.

In the acceleration sensor thus produced, the single crystal silicon substrate 1 is bonded through an $SiO_2$ film to the single crystal silicon substrate 8, so as to form an SOI structure. In addition, in the cantilever 13, its thickness L2 in a direction parallel to the surface of the single crystal silicon substrate 1 is smaller than the thickness L1 in a direction of the depth of the single crystal silicon substrate 1. Accordingly, the cantilever 13 becomes movable, on the surface of the single crystal silicon substrate 1, in a direction parallel to the surface, whereby an acceleration to a direction parallel to the substrate surface is detected.

As mentioned in the foregoing, in the present embodiment, on the main surface of the single crystal silicon surface 1, there is formed a trench (groove) 3 of a predetermined depth for formation of the cantilever 13 (the first step), and the polysilicon film 6 is formed on the main surface of the single crystal silicon substrate 1, so as to fill the trench 3 with said polysilicon film 6, and the surface of the polysilicon film 6 is flattened (smoothed) (the second step). Subsequently, the main surface of the single crystal silicon substrate 1 is bonded to the single crystal silicon substrate 8 with an $SiO_2$ film 9 (insulating film) formed thereon, through said $SiO_2$ film 9 being interposed between the substrates 1 and 8 (the third step), whereafter the reverse side of the single crystal silicon substrate 1 is polished to a predetermined degree, so as to make the single crystalline silicon substrate into a thin film (the fourth step). Subsequently, the signal-processing circuit 10 is formed on the surface of the single crystal silicon substrate, whereafter the polysilicon film 6 is removed by etching from the reverse side of the single crystal silicon substrate, so as to form the cantilever 13 (the fifth step).

Accordingly, during the process for the formation of the signal-processing circuit 10, in the course of the wafer process, the trench 3 in the surface portion of the single crystal silicon substrate , is filled with the polysilicon film 6, whereby contamination of the IC elements, contamination of production equipment, and degradation or deterioration of electrical properties accompanied therewith can be prevented. That is, in the wafer process, by contriving to prevent the surface structures such as concave portions or penetration holes from appearing on the wafer surface in the heat treatment, photolithographic treatment and the like, in the course of the process, it is possible to prevent contamination and the like, and to thereby stably provide acceleration sensors of high precision.

The thus produced acceleration sensor comprises the single crystal silicon substrate 1, which is bonded through an $SiO_2$ film (insulating film) to the single crystal silicon substrate 8, and which is made a thin film; the cantilever 13, which is formed on said single crystal silicon substrate 1 and which is movable in a direction parallel to the surface of the substrate; and the signal-processing circuit 10, which is also formed on the single crystal silicon substrate 1 and which performs signal processing as the cantilever 13 moves owing to an acceleration. When an acceleration is applied in a direction parallel to the surface of the single crystal silicon substrate 1, the cantilever formed on the single crystal silicon substrate 1 moves. As the cantilever 13 moves, signal-processing is performed by the signal-processing circuit 10 formed on the single crystal silicon substrate 1. In such a way as above, by a micro-machining technique using single crystal silicon, an acceleration sensor is formed, by the novel structure of which high precision and high reliability can be realized.

In addition, since the surface of the aforesaid cantilever 13 and the part of the single crystal silicon substrate 1, opposing said cantilever 13, are coated with the $SiO_2$ film (insulator) 5, electrode short-circuit in the capacity type acceleration sensor can previously be prevented. In addition, it suffices if at least either of the surface of the cantilever 13 or the part of the single crystal silicon substrate 1 opposing the cantilever 13 is coated with the $SiO_2$ film (insulator) 5.

Figure 11:
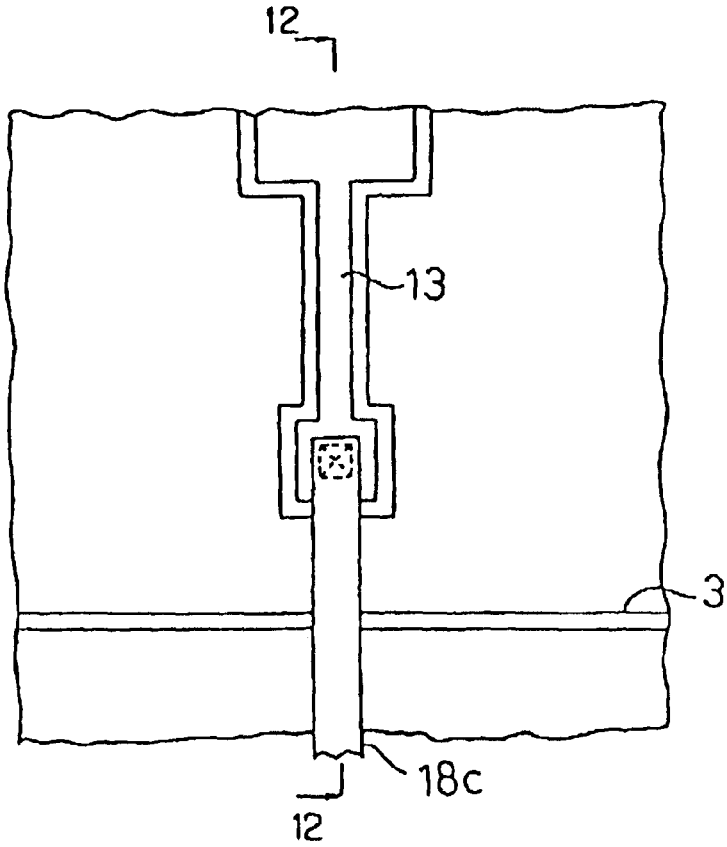
FIG. 11 is a plan illustrating an application example of the first embodiment.
Figure 12:
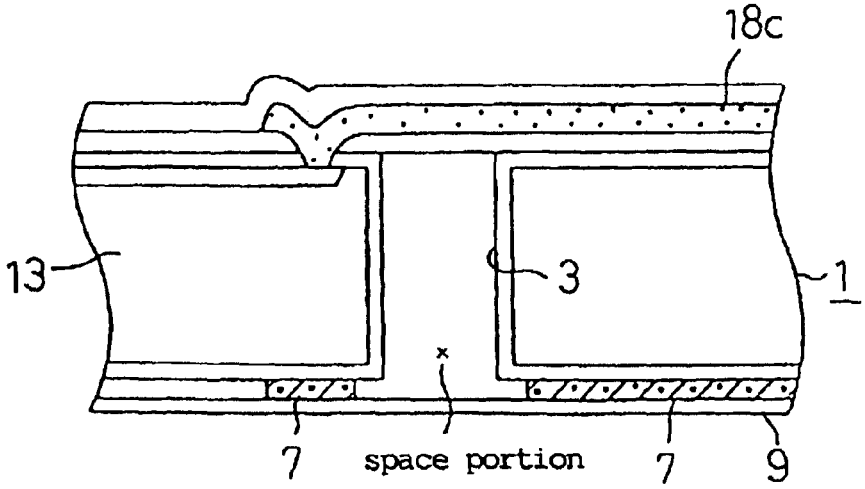
FIG. 12 is a sectional view taken along the line 12—12 in FIG. 11.

Further, as an application of the present embodiment, as illustrated in FIGS. 11 and 12, the cantilever may be separated from the signal-processing circuit (IC circuit portion) 10 and an air bridge wiring is formed, in order to reduce parasitic capacity. In addition, the fixed electrodes 14, 15, 16, and 17 may be formed so as to have the same structure as above. This can be realized by forming a $p^+$ type polysilicon film 7 at the minimum position necessary for bonding the fixed electrodes to the lower substrate.

In addition, although an aluminium wiring layer is used in the aforesaid embodiment, the wiring part may be formed by use of a polysilicon layer. Further, although two movable electrodes are formed at the end of the beam and simultaneously, four fixed electrodes 14, 15, 16, and 17 are formed, in the aforesaid embodiment, the movable and fixed electrodes may be formed like the teeth of a comb in order to further improve the sensitivity of the sensor.

In addition, an oxide film may selectively be formed, instead of the formation of the $p^+$ polysilicon film 7.

Second Embodiment

Next, there will be made explanations about the production process of the second embodiment, emphasizing the points that are different from those in the first embodiment. In addition, in the second embodiment to be hereafter explained, explanations will be made by way of an example of a case where a sensor having a structure according to the structure illustrated in FIGS. 1 and 2, as explained in the aforesaid first embodiment, and there will be illustrated a sectional view corresponding to the 2—2 section of FIG. 1.

In the aforesaid first embodiment, in order to form the cantilever 13, the $p^+$ diffused layer ($p^+$polysilicon film) 7 is formed for the purpose of separating the cantilever portion from the single crystal silicon substrate at a predetermined distance, but in second present embodiment, a concave portion is formed before formation of a trench, for the purpose of separating the cantilever from the substrate at a predetermined distance.

In FIGS. 13 to 21, the production process is illustrated.

Figure 13:
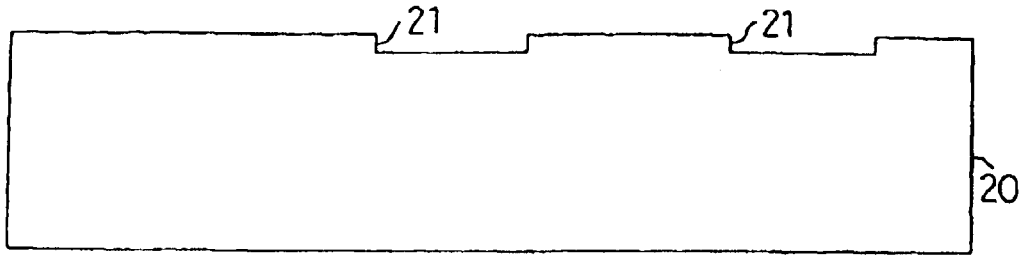
FIGS. 13 to 21 are illustrations for explanation of the manufacturing process of the second embodiment, and, respectively, a sectional view for each production stage.
Figure 14:
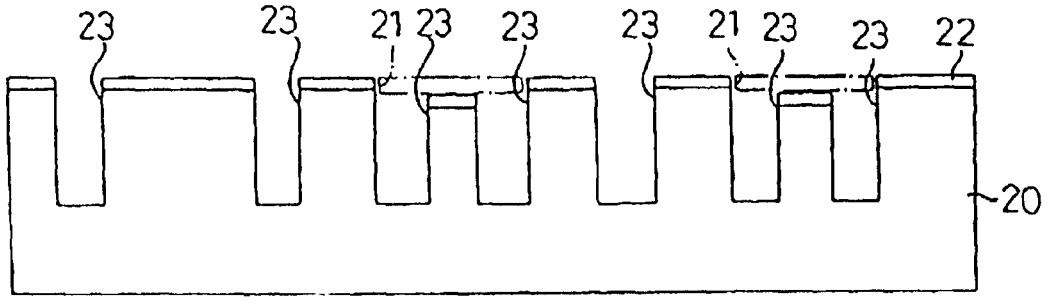

First, as illustrated in FIG. 13, an n type (100) single crystal silicon substrate 20 is provided, and on the main surface of the provided single crystal silicon substrate 20, there is formed a concave portion 21 with a predetermined depth e.g. ranging from 0.1 to 5 μm. Subsequently, as illustrated in FIG. 14, on the main surface of the single crystal silicon substrate 20, there is formed an $SiO_2$ film 22, and a pattern is formed by a photolithographic means, in the same way as in the aforesaid first embodiment. Subsequently, on the main surface of the single crystal silicon substrate 20 including the bottom of the concave portion 21, there is formed a trench with a depth ranging from about 0.1 to about 30 μm (3 μm in the present embodiment) by dry etching or the like.

Figure 15:
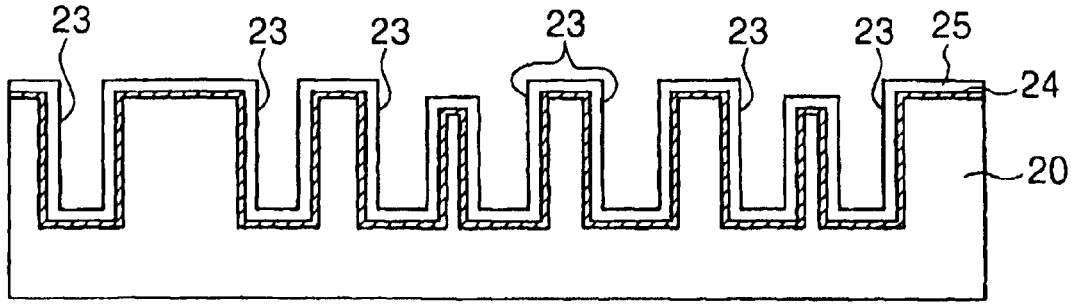
Figure 16:
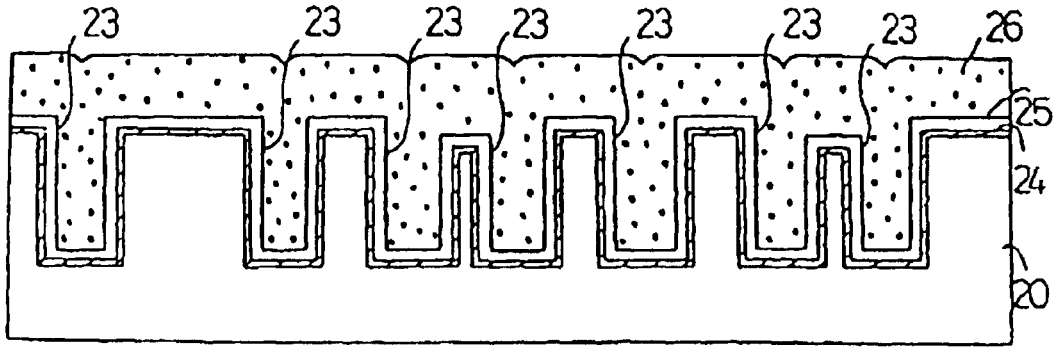

Subsequently, as illustrated in FIG. 15, on the main surface of the single crystal silicon substrate 20 including the internal wall of the trench 23, there is formed an $n^+$ diffused layer 24, and an $SiO_2$ film 25 is formed by thermal oxidation. Thereafter, as illustrated in FIG. 16, a polysilicon film 26 is deposited in the trench 23 by the LPCVD method.

Figure 17:
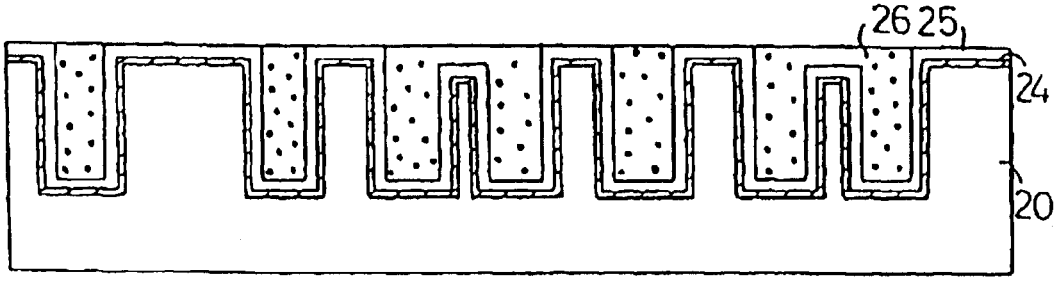

Subsequently, as illustrated in FIG. 17, the surface of the polysilicon film 26 is polished by use of the $SiO_2$ film as an etching stopper, so as to smooth the surface. In the above case, although it is desirable that the surfaces of the polysilicon film 26 and the $SiO_2$ film 25 become smooth, even if the polysilicon film 26 is rather indented, so long as the surface of the $SiO_2$ film is made smooth, no inconvenience is caused in the subsequent wafer cementing.

Figure 18:
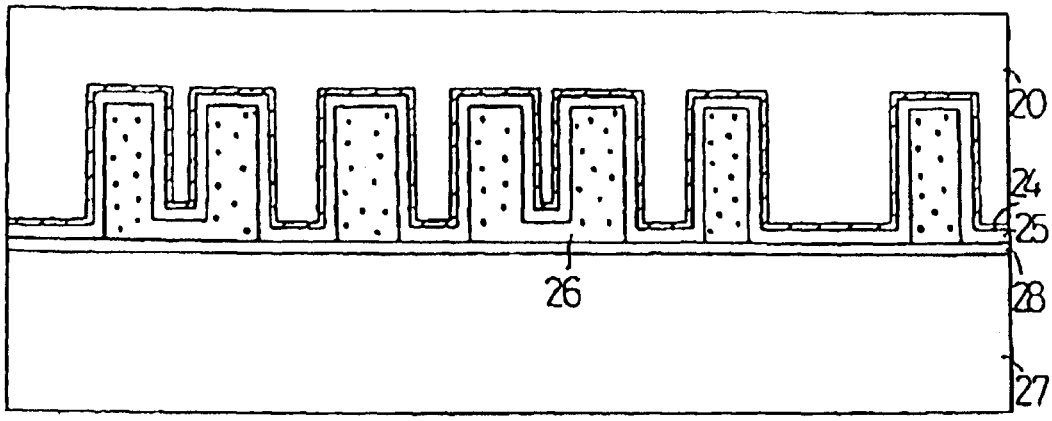

On the other hand, as illustrated in FIG. 18, another (100) single crystal silicon substrate 27 is provided, and, on the main surface of the substrate 27, there is formed an $SiO_2$ film with a thickness ranging from 0.1 to 1.0 μm by thermal oxidation of the substrate. Subsequently, single crystal silicon substrates 20 and 27 are dipped in e.g. a solution of an aqueous hydrogen per oxide and sulfuric acid, so as to subject them to a hydrophilicity-imparting treatment. Subsequently, the substrates are dried, and thereafter, the main surfaces of the two single crystal silicon substrates 20 and 27 are put together at room temperature, and introduced into a furnace at 400 to 1100° C. for a period of time ranging from 0.5 and 2 hours, so as to strongly bond the two surfaces.

Figure 19:
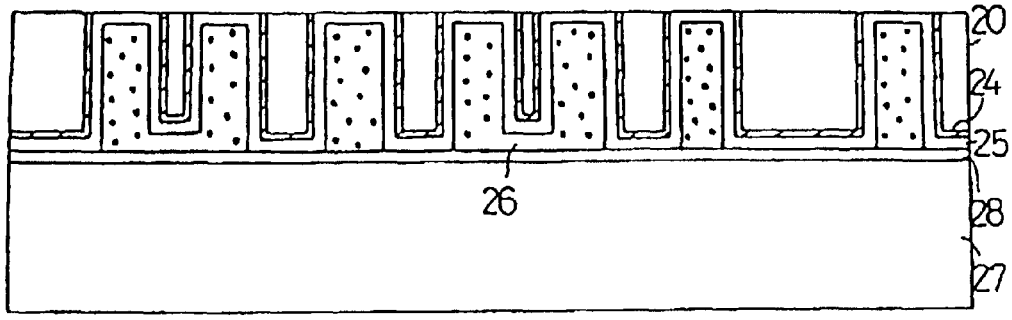

Subsequently, as illustrated in FIG. 19, the reverse side of the single crystal silicon substrate 20 is subjected to selective polishing by use of an aqueous solution of alkali type, e.g. an aqueous KOH solution. The selective polishing is performed until the $SiO_2$ film 25 appears on the surface. As a result, the thickness of the single crystal silicon substrate 20 becomes e.g. about 3 μm, so as to be made a thin film.

Figure 20:
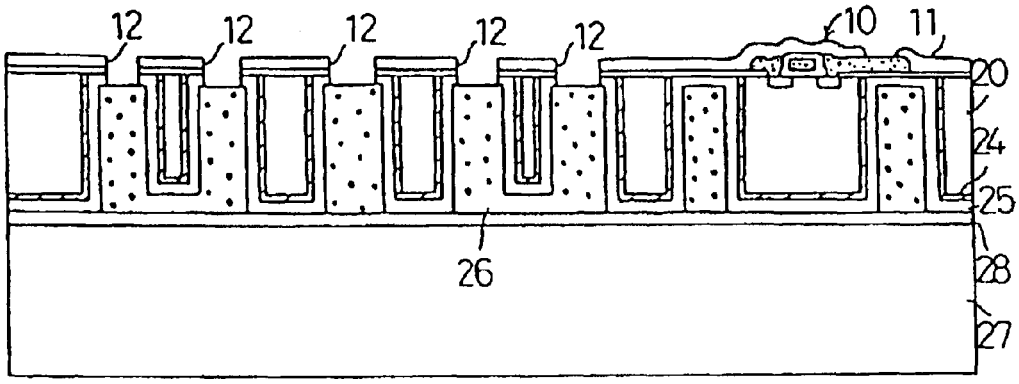

Subsequently, as illustrated in FIG. 20, a signal-processing circuit (IC circuit portion) 10 is formed through an ordinary CMOS process, bipolar process, or the like. Further, on the upper surface of the signal-processing circuit 10, there is formed, as a passivation film 11, a plasma SiN film (P-SiN film) by e.g. plasma CVD method.

Subsequently, windows 12 are opened at predetermined areas of the passivation film 11, and the polysilicon film 20 is exposed to the surface at the sensor portion.

Figure 21:
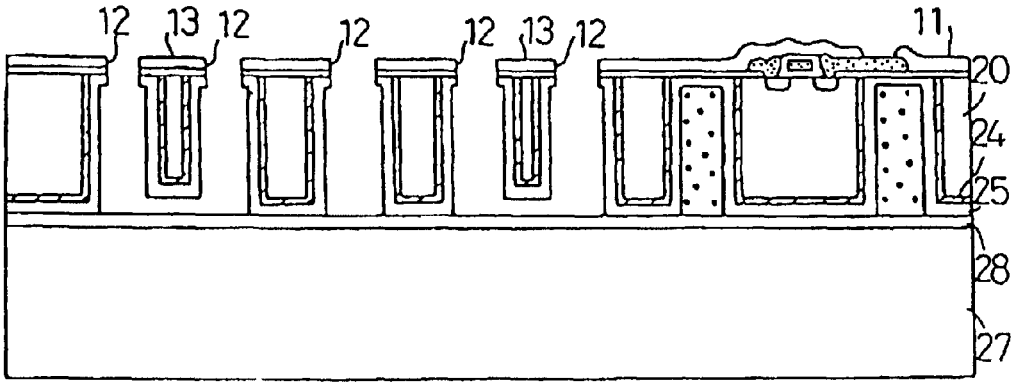

Subsequently, as illustrated in FIG. 21, by use of a 20% solution of TMAH (tetramethylammonium hydroxide) $(CH_3)_4NOH$, the polysilicon film 26 is removed by etching from the reverse side of the single crystal silicon substrate 20 through the windows 12 on the passivation film 11. In the above case, the passivation film 11 (P-SiN), $SiO_2$ film, and aluminium wiring layer are hardly etched by the selective etching.

As a result, a cantilever 13 is formed.

Also by the present embodiment, there is obtained the same effect as in the aforesaid first embodiment.

Third Embodiment

Next, there will be made explanations about the production process in the third embodiment, laying stress on the differential points between the first and third embodiments.

Although, in the aforesaid first and second embodiments, the trench is filled with polysilicon before the bonding of the wafers, in the present embodiment, the trench is filled with polysilicon after the bonding of wafers, and in the final stage, the thus filled polysilicon is removed, so as to produce an acceleration sensor.

In FIGS. 22 to 28, the production process is illustrated.

Figure 22:
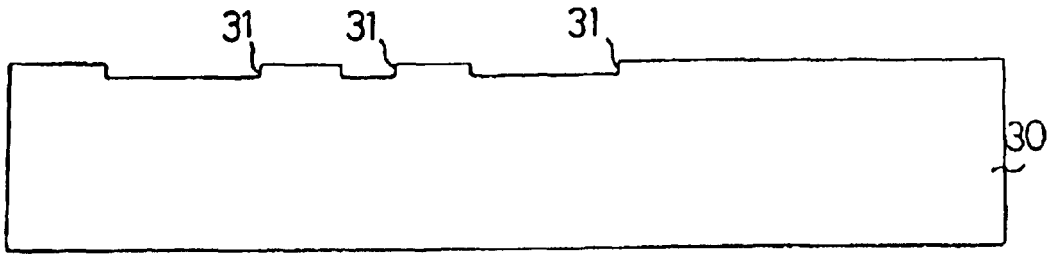
FIGS. 22 to 28 are illustrations for explanation of the manufacturing process of the third embodiment, and, respectively, a sectional view for each production stage.
Figure 23:
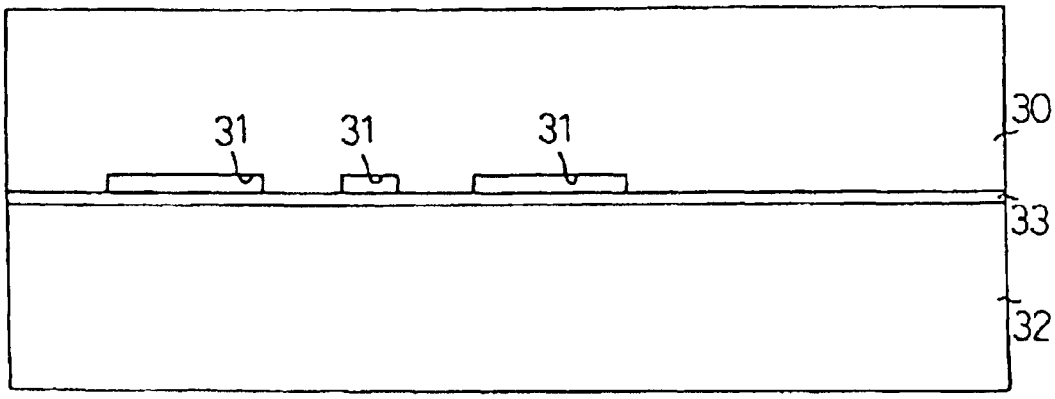

First, as illustrated in FIG. 22, an n-type (100) single crystal silicon substrate 30 is provided, and on the main surface of the provided single crystal silicon substrate 30, there is formed a concave portion 31 in a depth ranging from 0.1 to 5 μm, in the same way as in the aforesaid second embodiment. On the other hand, as illustrated in FIG. 23, a single crystal silicon substrate 32 is provided, and an $SiO_2$ film is formed by thermal oxidation on the main surface of the single crystal silicon substrate 31. Thereafter, the main surface of the single crystal silicon substrate 30 is bonded to the main surface of a single crystal silicon substrate 32.

Figure 24:
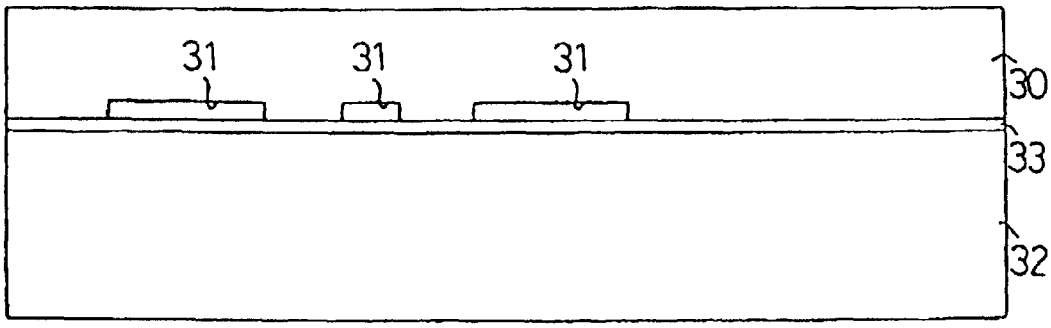
Figure 25:
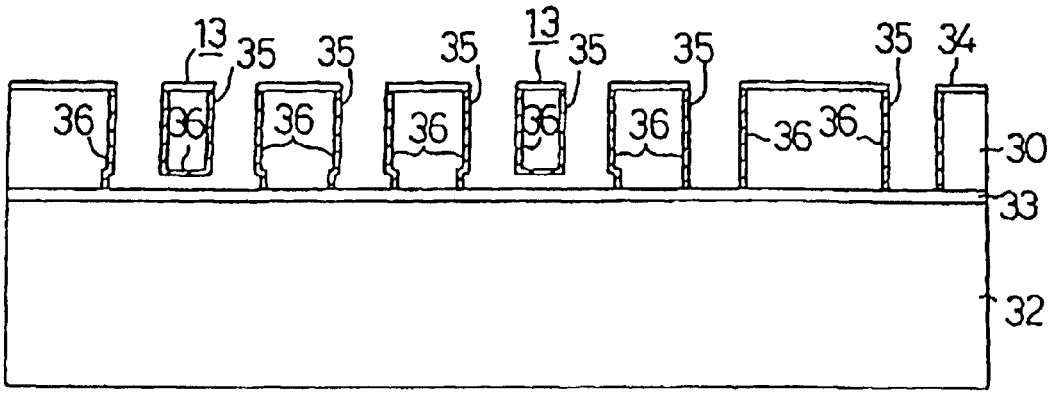

Subsequently, as illustrated in FIG. 24, the reverse side of the single crystal silicon substrate 30 is subjected to mirror polishing to a predetermined thickness (0.1 to 30 μm). Thereafter, as illustrated in FIG. 25, there is formed an $SiO_2$ film 34 to a thickness ranging from 0.1 to 2 μm, following which the $SiO_2$ film is subjected to patterning, and a trench 35 is formed by etching. Thereby, a cantilever 13 and a transversal insulatedly separated area of the processing circuit portion are formed.

Next, by thermal diffusion or the like, there is introduced an N type impurity of arsenic or phosphorus in a high concentration, and a highly concentrated $n^+$ layer 36 is formed in the silicon area which is not covered with $SiO_2$ films 33 and 34.

Figure 26:
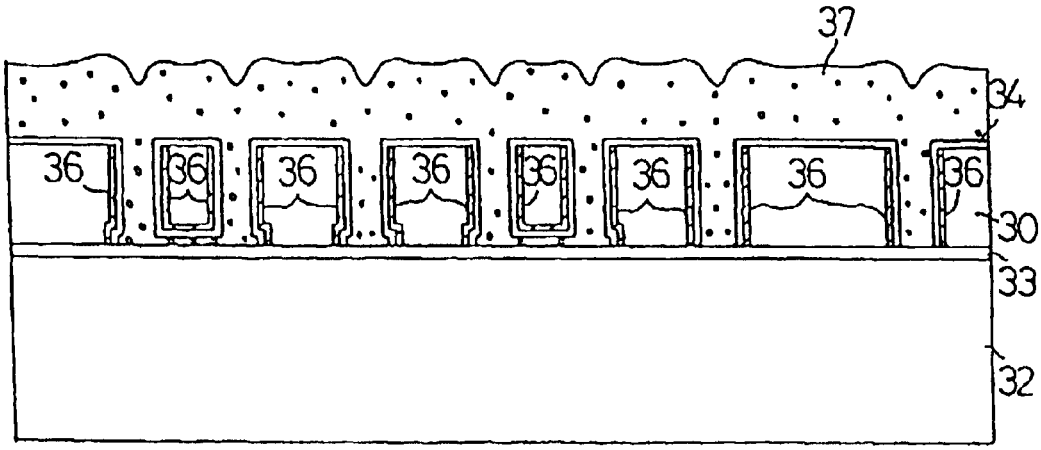
Figure 27:
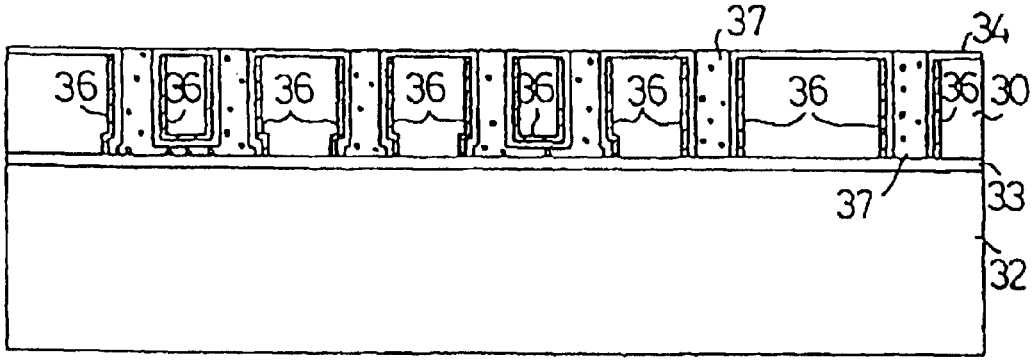
Figure 28:
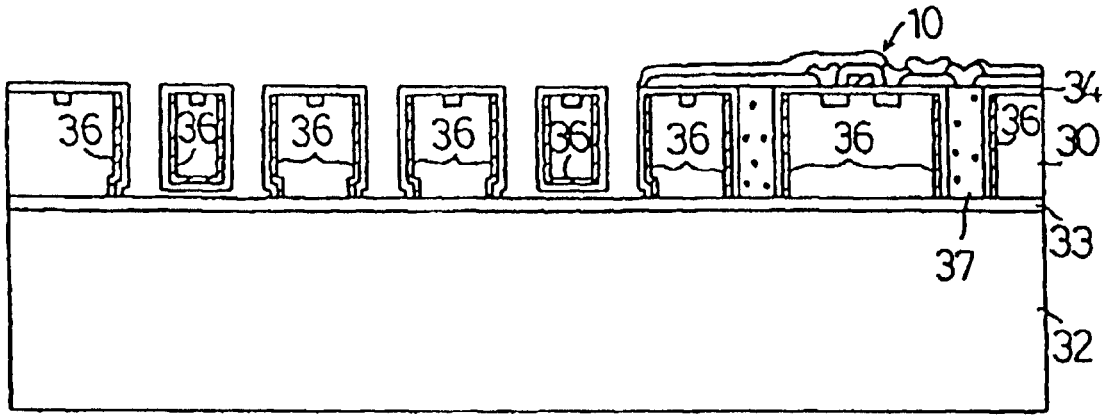

Subsequently, as illustrated in FIG. 26, a thermal oxidation film is formed on the side wall of the trench 35 and the like, whereafter a polysilicon film 37 is formed on the surface of the single crystal silicon substrate 30, and the trench 35 is filled with the polysilicon film 37. Thereafter, as illustrated in FIG. 27, the surface of the polysilicon film 37 is selectively polished and smoothed until the $SiO_2$ film 34 appears on the surface. Further, as illustrated in FIG. 28, a signal-processing circuit 10 is formed, and finally, the polysilicon film 37 is removed by etching from the reverse side (upper surface side) of the single crystal silicon substrate 30, so as to again separate the cantilever 13 from the substrate to allow it to move.

As described above, in the present third embodiment, the main surface of the single crystal silicon substrate 30 is bonded to the single crystal silicon substrate 32 with the $SiO_2$ film (insulating film) 33 formed thereon, through said $SiO_2$ film 33 being interposed between the substrates 30 and 32 (first step), and the reverse side of the single crystal silicon substrate is polished to a predetermined degree, so as to make the single crystal silicon substrate 30 a thin film (second step). Subsequently, on the reverse side of the single crystal silicon substrate 30, there is formed a trench (groove) 35 with a predetermined depth for formation of a cantilever 13 (third step), and the trench 35 is filled with the polysilicon film 37, and the surface of the polysilicon film 37 is smoothed (fourth step). Subsequently, a signal-processing circuit is formed on the single crystal silicon substrate 30, whereafter the polysilicon film 37 is removed, by etching, from the reverse side of the single crystal silicon substrate 30, so as to form a cantilever 13 (fifth step).

Therefore, in the process of formation of the signal-processing circuit 10 in the wafer, the trench 35 is filled with the polysilicon film 37 in the upper surface part of the single crystal silicon substrate 30, whereby contamination of the IC elements, contamination of the production apparatus, and degradation or deterioration of electrical properties attended therewith can be prevented. That is, by contriving not to make a surface structure such as a concave portion or a perforation of the like appear on the wafer surface in the heat treatment, the photolithographical treatment or the like in the course of the wafer process, contamination and the like can be prevented, so as to stabilize the wafer process, and a stable supply of acceleration sensors, of high precision, can be produced.

Fourth Embodiment

In the following, there will be made explanations about the production process of the fourth embodiment, laying stress on the differences between the present embodiment and the third embodiment.

The present embodiment is intended to produce an acceleration sensor at a lower cost than the production process of the third embodiment.

Figure 29:
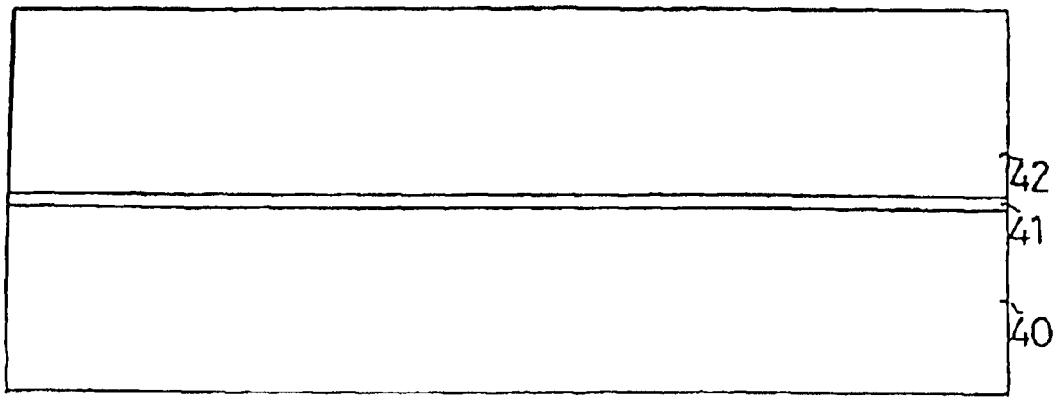
FIGS. 29 to 31 are illustrations for explanation of the manufacturing process of the fourth embodiment, and, respectively, a sectional view for each production stage.
Figure 30:
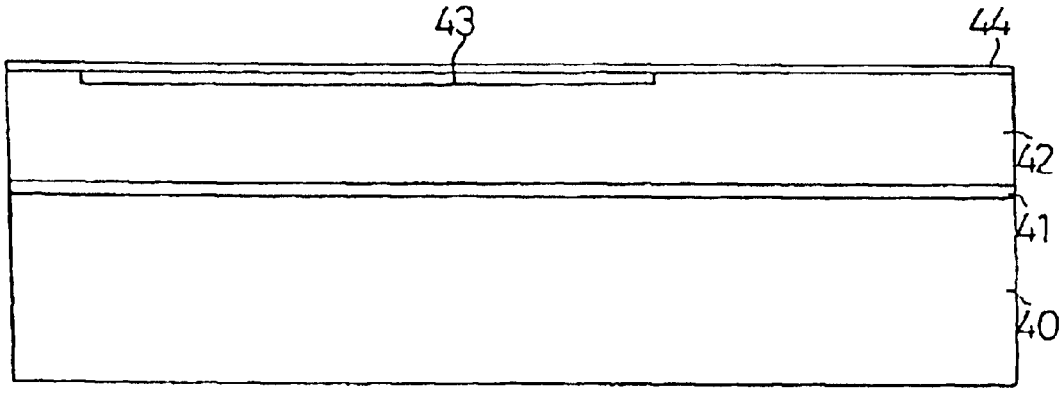
Figure 31:
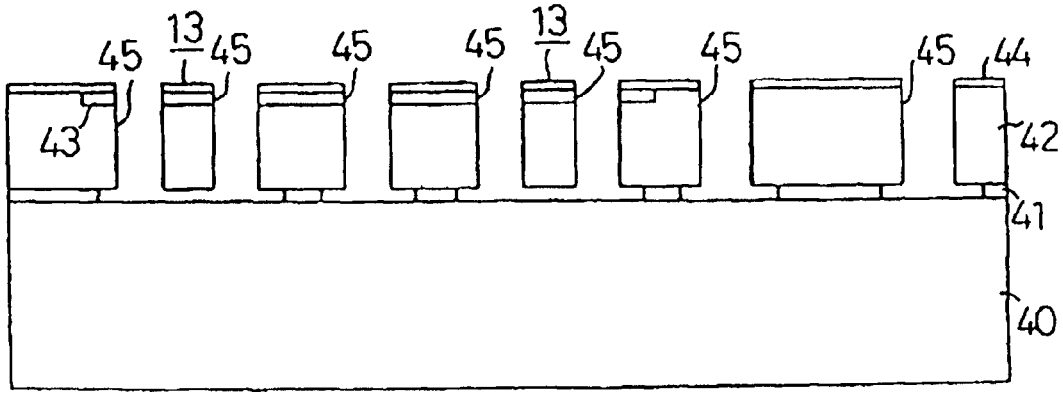

In FIGS. 29 to 31, the production process is illustrated.

First, as illustrated in FIG. 29, an $SiO_2$ film with a thickness ranging from 0.1 to 2 μm is formed on the main surface of a single crystal silicon substrate 40, and a single crystal silicon substrate 42 is bonded to the substrate 40 so as to interpose the $SiO_2$ film 41 between the substrates 40 and 42. Subsequently, as illustrated in FIG. 30, the upper surface of the single crystal silicon substrate 42 is polished so as to make the thickness of the single crystal silicon substrate a predetermined value. That is, the thickness of the single crystal silicon substrate 42 is reduced to e.g. about 3 μm. Thereafter, a highly concentrated $n^+$ diffused layer 43 is formed on the upper surface of the single crystal silicon substrate 42, and further, an $SiO_2$ film 44 is formed thereon. It suffices if this highly concentrated $n^+$ diffused layer 43 is formed corresponding to the parts of the sensor which will be formed as movable electrodes and fixed electrodes.

Subsequently, as illustrated in FIG. 31, patterning is applied to an $SiO_2$ film, as in the third embodiment, and a trench 45 is formed on the single crystal silicon substrate 42. Thereafter, the SiO2 film 41 below this trench 45 is partly removed by etching with an aqueous hydrofluoric acid solution. In this case, a part of $SiO_2$ film 41, below the part to be formed as a cantilever 13, is completely removed, and another part of the $SiO_2$ film 41, below the part to be formed as solid electrodes and signal-processing circuit portion, is left. Because the lower portion of the part is to be formed as the cantilever 13 it is narrower than with the other part. In addition, in the above case, the highly concentrated $n^+$ diffused layer 43 is separated into the cantilever 13 and fixed electrodes.

Subsequently, through the same processes as illustrated in FIGS. 26 to 28, there is produced a capacity type acceleration sensor.

In the following, there will be explained application examples of the fourth embodiment with reference to FIGS. 32 to 34.

Figure 32:
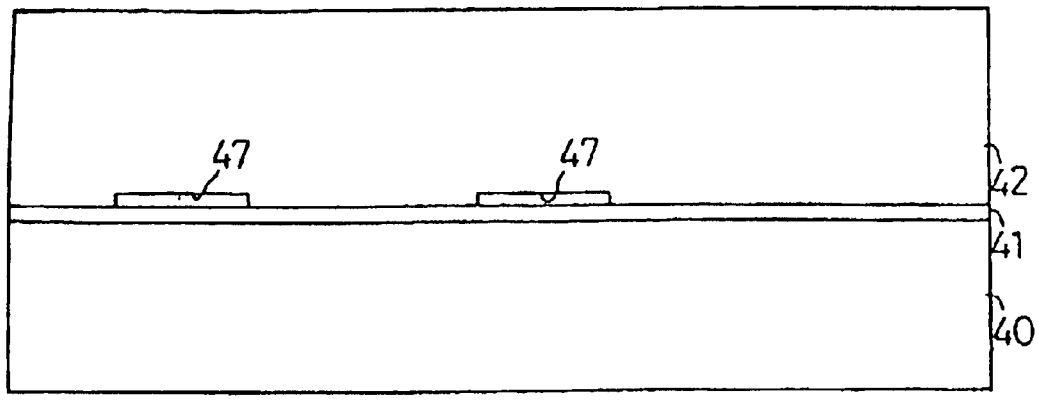
FIGS. 32 to 34 are illustrations for explanation of the manufacturing process examples to which the fourth embodiment is applied, and, respectively, a sectional view for each production stage.
Figure 33:
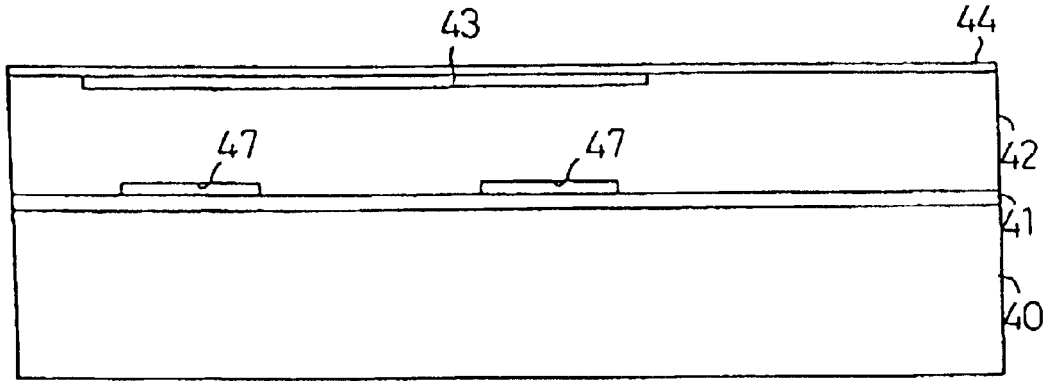

First, as illustrated in FIG. 32, an $SiO_2$ film with a thickness ranging from 0.1 to 2 μm is formed on the main surface of the single crystal silicon substrate 40, and a concave portion 47 with a depth ranging from 0.1 to 3 μm is formed at the area of the main surface of the single crystal silicon substrate 42, on which area a cantilever is to be formed. Subsequently, the main surface of the single crystal silicon substrate 42 is bonded to the main surface of the single crystal silicon substrate 40, the $SiO_2$ film 41 being put therebetween. Further, as illustrated in FIG. 33, the upper surface of the single crystal silicon substrate 42 is polished so as to give the single crystal silicon substrate 42 a predetermined thickness. That is, the thickness of the single crystal silicon 42 is made thin to a value of about 3 μm. Subsequently, the aforesaid highly concentrated diffused layer 43 is formed on the upper surface of the single crystal silicon substrate 42, and an $SiO_2$ film 44 is formed thereon.

Figure 34:
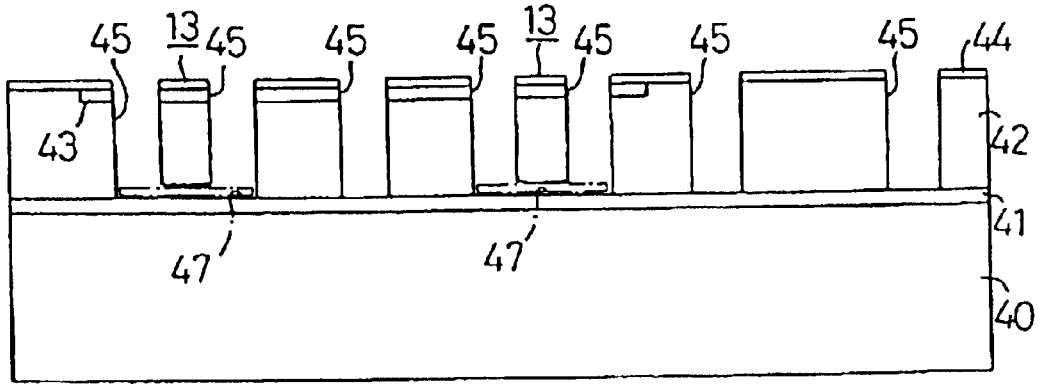

Subsequently, as illustrated in FIG. 34, onto the single crystal silicon substrate 42, there are formed trenches 45 extending to the concave portions 47, and cantilevers 13 are formed.

Thereafter, a capacity type acceleration sensor is produced through the same processes as illustrated in FIGS. 26 to 28.

By conducting the aforesaid procedures, electrical insulation can be made more securely as compared with the case where the $SiO_2$ film 41 is partly removed by etching. In addition, the mechanical strength of the sensor can be improved.

In addition, the present invention is not restricted to the aforesaid embodiments, and is applicable to a twin-lever spring or a polyever spring embodiment, in addition to a cantilever spring embodiment.

Figure 35:
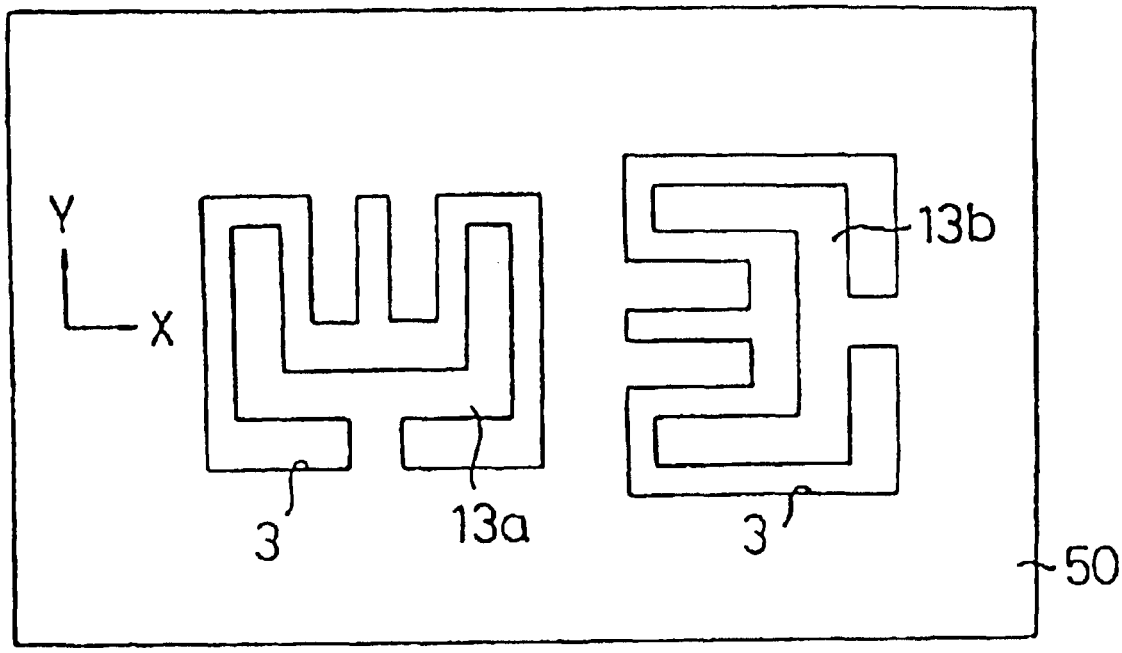
FIG. 35 is a plan illustrating an example of a sensor tip formed by an acceleration sensor according to the present invention.

In addition, as illustrated in FIG. 35, it is possible to form two acceleration sensors 13a and 13b onto a single crystal silicon substrate 50, for detecting the acceleration in the direction X by the acceleration sensor 13a, and the acceleration in the direction Y by the acceleration sensor 13b. Further, it is possible to form an acceleration sensor capable of detecting the acceleration in a direction surface perpendicular to these X and Y direction acceleration sensors 13a and 13b, on the same substrate, so as to detect an acceleration in three-dimensionals. In addition, when the present acceleration sensor is used as a capacity type acceleration sensor, it is possible to further stabilize the properties by forming the present acceleration sensor into a so-called "servo type" sensor (with a closed-loop circuit).

In addition, in the aforesaid embodiments, the trenches (grooves) 3, 23, and 35 are filled with polysilicon films 6, 26, and 37, respectively, but there may be used a film of polysilicon, amorphous silicon or a mixed silicon containing polysilicon and amorphous silicon.

In addition, in the aforesaid embodiments, a sensor portion and a signal-processing portion are formed in the single crystal silicon substrate to be formed as the upper side, but the present acceleration sensor is not restricted to such a structure, and it is possible to utilize also a single crystal silicon substrate formed as a base, and form a sensor portion and a signal-processing portion on the lower substrate.

As described in detail in the foregoing, according to the present invention, high precision and high reliability can be realized by formatting a novel structure. In addition, when a signal-processing circuit is provided on the same chip as a movable beam, since there is produced neither a hollow part nor a groove during the production process, it is possible to make the processing stable. In addition, it is at the final step that the movable beam is made movable with respect to the substrate, whereby, in the case of the movable beam being bonded to the lower substrate to be formed as a pedestal or in the case of a circuit being formed, or the like, minute beams can be prevented from being broken, and the yield thereof can be made higher. In addition, since it is a micromachining technique which determines the shape of the present acceleration sensor, the present acceleration sensor can be produced with high precision.

[Industrial Availability]

As described in the foregoing, the present invention is useful for the production of a semi-conductor acceleration sensor having minute movable parts, and the present acceleration sensor is suitable as an acceleration sensor to be used for air bag system, suspension control system and the like of automobiles. In addition, the present invention can be applied to a capacity type acceleration sensor for detecting acceleration in multiple directions.

I claim:

[1. An acceleration sensor comprising:

a first substrate formed of a silicon material which is used as a conductive material;

a second substrate provided on the lower side of said first substrate and electrically insulated from the first substrate;

said first substrate including:

a support beam having a mass portion forming capacitive electrodes for displacement in a parallel direction to a surface of said second substrate according to the degree of acceleration, a fixed portion for fixing said support beam to said second substrate and a support portion for intermediately supporting said mass portion to said fixed portion, an insulating groove extending through a thickness of said first substrate around the entire periphery of said support beam, and stationary blocks forming capacitive electrodes defined by said insulating groove on the outer sides of said support beam separately across said insulating groove and fixed to said second substrate; and gap means forming a gap space in order to space said mass portion and said supporting portion from a surface of said second substrate; and said second substrate being separated from said first substrate by an insulating layer which is at least provided on the lower side of said fixed portion and stationary blocks.]

[2. An acceleration sensor as defined in claim 1, wherein said insulating groove defines a narrow detection groove between said mass portion of said support beam and each of said stationary blocks, and movable and stationary electrodes are formed on lateral side surfaces of said support beam and said stationary blocks in face to face relation with each other across said detection groove.]

[3. An acceleration sensor as defined in claim 1, wherein said support beam is securely fixed to said second substrate at said fixed end, and reduced in a width in said support portion to provide at least one support for said mass portion in a fore free end portion to be displayed horizontally according to the degree of acceleration in the fashion of at least one fulcrum point type acceleration sensor.]

[4. An acceleration sensor as defined in claim 3, wherein said width of said support portion is smaller than a thickness of said fixed portion and said support beam provides a cantilever type support.]

[5. An acceleration sensor as defined in claim 1, wherein said first substrate is formed of silicon material with a (100) crystal face.]

[6. An acceleration sensor as defined in claim 5, wherein said first substrate is formed of a n-type silicon material.]

[7. An acceleration sensor as defined in claim 1, wherein said second substrate is formed of a silicon material having a surface covered with an insulating oxidation film.]

[8. An acceleration sensor comprising:

a substrate which is selected from the group consisting of an insulating material and oxidized semiconductor material;

a support beam which includes a mass portion forming a predetermined mass and first capacitive electrodes on side surfaces of said mass portion, a fixed portion for fixing said support beam to said substrate and a thin support portion for intermediately connection between said mass portion and said fixed portion;

a pair of stationary blocks arranged on both sides of said support beam separately across an air gap and fixed to said substrate, said stationary blocks provided with second capacitive electrodes on the opposite sides of first capacitive electrodes of said mass portion;

gap means forming a gap space in order to space said mass portion and thin support portion from a surface of said substrate; and said mass portion being displace in a parallel direction to the surface of said substrate according to the degree of acceleration and said support beam and stationary blocks formed of a silicon material which is used as a conductive material and electrically insulated from said substrate.]

[9. An acceleration sensor as defined in claim 8, wherein said gap means is formed of an insulating layer at least between said substrate and said fixed portion of the support beam and said stationary blocks.]

[10. An acceleration sensor as defined in claim 8, wherein movable and stationary electrodes are formed on lateral side surfaces of said mass portion and said stationary blocks in face to face relation with each other across said air gap.]

[11. An acceleration sensor as defined in claim 8, wherein a width of said thin support portion is smaller than a thickness of said fixed portion.]

[12. An acceleration sensor as defined in claim 8, wherein said support beam and stationary blocks are formed of a n-type silicon material with a (100) crystal face.]

[13. An acceleration sensor as defined in claim 8, wherein said substrate is formed of a silicon material having a surface covered with an insulating oxidation film.]

[14. An acceleration sensor comprising:

A. a first single crystalline silicon substrate having a first surface and a second surface opposite said first surface;

B. a second single crystalline silicon substrate connected to a side of said first surface of said first single crystalline silicon substrate with an insulating layer interposed therebetween;

C. said first single crystalline silicon substrate including:

i. a movable beam defined by a trench which is disposed to surround said movable beam and extend from said second surface to said first surface, said movable beam being supported by said second single crystalline silicon substrate through said insulating layer to be displaceable in a direction parallel to said first surface of said first single crystalline silicon substrate, ii. a stationary block disposed to be spaced apart from said movable beam via said trench, facing said movable beam to form a pair of capacitive electrodes with said movable beam, and fixed to said second single crystalline silicon substrate; and D. a signal-processing circuit element for carrying out a processing operation based on a change of capacitance between said capacitive electrodes.]

[15. An acceleration sensor according to claim 14, wherein said movable beam has a first thickness along said direction parallel to said first surface of said first single crystal silicon substrate and a second thickness in a direction perpendicular to said first surface of said first crystal silicon substrate, said first thickness being smaller than said second thickness.]

[16. An acceleration sensor according to claim 14, wherein at least one of a surface of said movable beam exposed to said trench and a surface of said first single crystal silicon substrate facing said movable beam is covered with an insulator.]

[17. An acceleration sensor according to claim 14, wherein said movable beam or said stationary block comprise an impurity-doped region to form said capacitive electrodes.]

[18. An acceleration sensor according to claim 14, further comprising first, second and third stationary blocks, each of which is formed of a part of said first single crystal silicon substrate, and wherein said movable beam includes a first branch and a second branch, said first branch being interposed between said stationary block and said first stationary block with a first air gap defined therebetween, said second branch of said movable beam being interposed between said second and said third stationary blocks with a second air gap defined therebetween, said stationary block and said second stationary block being electrically connected with each other, said first and said third stationary blocks being electrically connected with each other.]

[19. An acceleration sensor according to claim 14, wherein said signal-processing circuit is disposed on said first single crystal silicon substrate.]

[20. An acceleration sensor comprising:

A. a first single crystalline silicon substrate having a first surface and a second surface opposite said first surface;

B. a second single crystalline silicon substrate connected to a side of said first surface of said first single crystalline silicon substrate with an insulating layer interposed therebetween;

C. said first single crystalline silicon substrate being divided by a trench extending from said second surface to said first surface;

i. a movable beam portion surrounded by said trench, said movable beam portion being supported by said second single crystalline silicon substrate through said insulating layer to be displaceable in a direction parallel to said first surface of said first single crystalline silicon substrate, said movable beam portion having a movable electrode, ii. a stationary portion disposed to be spaced apart from said movable beam via said trench, having a stationary electrode which faces said movable beam via said trench to form a pair of capacitive electrodes with said movable electrode, and fixed to said second single crystalline silicon substrate; and D. an insulator covering at least one of a surface of said movable electrode and a surface of said stationary electrode.]

[21. An acceleration sensor according to claim 20, further comprising a signal-processing circuit defined in the first single crystal silicon substrate for carrying out a processing operation based on a change of a capacitance between said movable electrode and said stationary electrode.]

*22. A semiconductor dynamic amount sensor comprising:*

*a semiconductor layer provided on a silicon substrate; and*

*a movable portion displaceable in a direction of a plane of said semiconductor layer according to a dynamic amount and formed in said semiconductor layer,*

*whereby said semiconductor dynamic amount sensor generates a signal according to displacement of said movable portion; and*

*wherein both surfaces of said movable portion and the semiconductor layer facing said movable portion are covered with an insulating material.*

*23. The semiconductor dynamic amount sensor according to claim 22, wherein said insulating material is a dielectric material.*

*24. The semiconductor dynamic amount sensor according to claim 22, wherein said insulating material is an oxide film.*

*25. The semiconductor dynamic amount sensor according to claim 22, wherein said semiconductor layer is formed of single crystal silicon.*

*26. The semiconductor dynamic amount sensor according to claim 22, wherein a polysilicon layer is formed between the semiconductor layer facing said movable portion and said silicon substrate.*

*27. The semiconductor dynamic amount sensor according to claim 22, wherein an $n^+$-region is formed as an electrode in said movable portion.*

*28. The semiconductor dynamic amount sensor according to claim 22, wherein said movable portion comprises a displaceable beam portion and said beam portion has a thickness in a direction of the semiconductor layer thickness greater than a width in a direction of the semiconductor layer plane.*

*29. The semiconductor dynamic amount sensor according to claim 22, wherein an $n^+$-region is formed as an electrode in said movable portion.*

*30. The semiconductor dynamic amount sensor according to claim 29, wherein said movable portion comprises a displaceable beam portion and said beam portion has a thickness in a direction of the semiconductor layer thickness greater than a width in a direction of the semiconductor layer plane.*

*31. A semiconductor dynamic amount sensor comprising:*

*a semiconductor layer provided on a silicon substrate having an insulating material on the surface thereof; and*

*a movable portion formed by said semiconductor layer and comprising a weight portion, a beam portion and a movable electrode, which is displaceable in a direction of a plane of said semiconductor layer according to a dynamic amount,*

*whereby said semiconductor dynamic amount sensor generates a signal according to the displacement of said movable portion; and*

*wherein said movable portion and said semiconductor layer facing said movable portion are placed in a circumstance of possible contact when an acceleration is applied to said movable portion, and both a lateral surface of said movable portion perpendicular to the surface of said semiconductor layer and a lateral surface of the semiconductor layer perpendicular to the surface of said semiconductor layer and facing said movable portion are covered with an insulating material different from said semiconductor layer.*

*32. The semiconductor dynamic amount sensor according to claim 31, wherein said movable portion comprises a displaceable beam portion and said beam portion has a thickness in a direction of the semiconductor layer thickness greater than a width in a direction of the semiconductor layer plane.*

*33. A semiconductor dynamic amount sensor comprising:*

*a semiconductor layer provided on a silicon substrate having an insulating material on the surface thereof; and*

*a movable portion formed by said semiconductor layer comprising a weight portion, a beam portion and a movable electrode, which is displaced in parallel with the surface of said semiconductor layer according to the action of acceleration, said movable portion comprising a plurality of movable electrodes, said semiconductor layer comprising a plurality of stationary electrodes facing said plurality of movable electrodes, and said movable electrodes and said stationary electrodes are in a comb teeth form,*

*whereby said semiconductor dynamic amount sensor generates a signal according to the displacement of said movable portion; and*

*wherein said movable portion and said semiconductor layer facing said movable portion are placed in a circumstance of possible contact when an acceleration is applied to said movable portion, and at least either of a lateral surface of said movable portion perpendicular to the surface of said semiconductor substrate or a lateral surface of the semiconductor layer perpendicular to the surface of said semiconductor substrate and facing said movable portion is covered with an insulating material different from said semiconductor layer.*

*34. The semiconductor dynamic amount sensor according to claim 33, wherein said movable portion comprises a displaceable beam portion and said beam portion has a thickness in a direction of the semiconductor layer thickness greater than a width in a direction of the semiconductor layer plane.*

*35. A semiconductor dynamic amount sensor according to claim 31, wherein said insulating material is an oxide film.*

*36. The semiconductor dynamic amount sensor according to claim 35, wherein said movable portion comprises a displaceable beam portion and said beam portion has a thickness in a direction of the semiconductor layer thickness greater than a width in a direction of the semiconductor layer plane.*

*37. The semiconductor dynamic amount sensor according to claim 31, wherein said semiconductor layer is formed of single crystal silicon.*

*38. The semiconductor dynamic amount sensor according to claim 37, wherein said movable portion comprises a displaceable beam portion and said beam portion has a thickness in a direction of the semiconductor layer thickness greater than a width in a direction of the semiconductor layer plane.*

*39. The semiconductor dynamic amount sensor according to claim 31, wherein a polysilicon layer is formed between*

*the semiconductor layer facing said movable portion and said silicon substrate.*

*40. The semiconductor dynamic amount sensor according to claim 39, wherein said movable portion comprises a displaceable beam portion and said beam portion has a thickness in a direction of the semiconductor layer thickness greater than a width in a direction of the semiconductor layer plane.*

*41. A semiconductor dynamic amount sensor comprising:*

*a semiconductor layer provided on a silicon substrate; and*

*a movable portion formed by said semiconductor layer for being displaceable and formed in said semiconductor layer, said movable portion comprising a plurality of movable electrodes, said semiconductor layer comprising a plurality of stationary electrodes facing said plurality of movable electrodes, said movable electrodes and said stationary electrodes being in a comb teeth form;*

*whereby said semiconductor dynamic amount sensor generates a signal according to the displacement of said movable portion; and*

*wherein both surfaces of said movable portion and said semiconductor layer facing said movable portion are covered with an insulating material.*

*42. A semiconductor dynamic amount sensor comprising:*

*a semiconductor layer provided on a silicon substrate; and*

*a movable portion displaceable in a direction of the plane of said semiconductor layer according to a dynamic amount and formed in said semiconductor layer;*

*whereby said semiconductor dynamic amount sensor generates a signal according to the displacement of said movable portion; and*

*wherein both surfaces of said movable portion and said semiconductor layer facing said movable portion are covered with an insulating material.*

*43. The semiconductor dynamic amount sensor according to claim 22, wherein the movable portion comprises a plurality of movable electrodes, said semiconductor layer comprises a plurality of stationary electrodes facing said plurality of movable electrodes, and said movable electrodes and said stationary electrodes are in a comb teeth form.*

*44. The semiconductor dynamic amount sensor according to claim 42, wherein the movable portion comprises a plurality of movable electrodes, the semiconductor layer comprises a plurality of stationary electrodes facing said plurality of movable electrodes, and said movable electrodes and said stationary electrodes are in a comb teeth form.*

* * * * *